Dec. 23, 1924.                                                                         1,520,360
C. J. McCLURE
LIQUID LEVEL GAUGE
Filed April 27, 1922
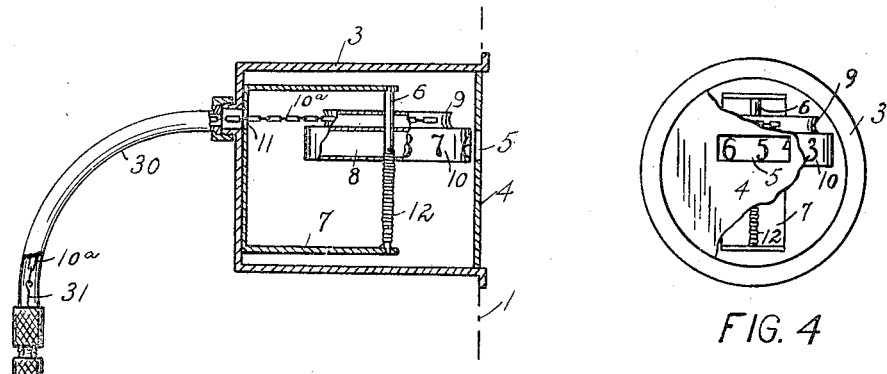
FIG. 4
FIG. 1
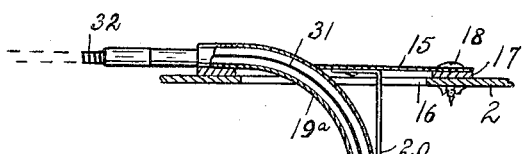
FIG. 2
FIG. 3
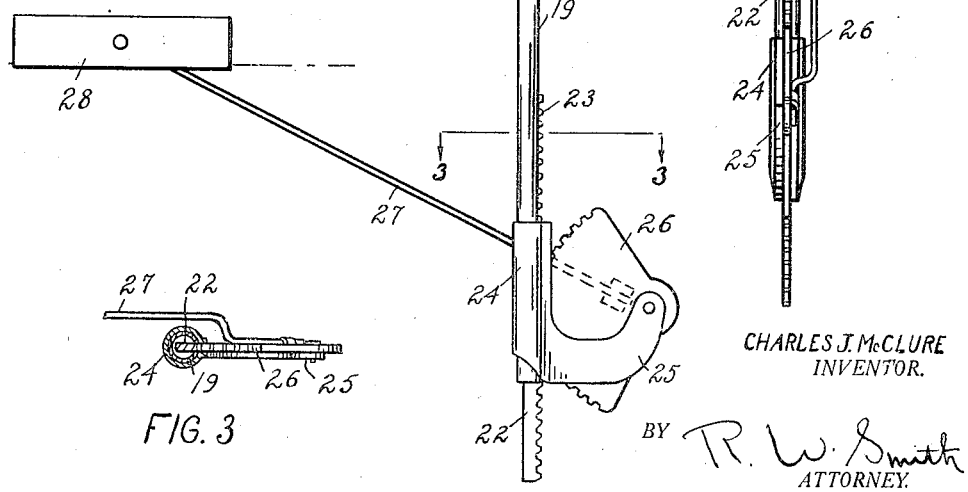
CHARLES J. McCLURE
INVENTOR.
BY R. W. Smith
ATTORNEY.

Patented Dec. 23, 1924.

1,520,360

UNITED STATES PATENT OFFICE.

CHARLES J. McCLURE, OF EAGLE ROCK, CALIFORNIA, ASSIGNOR OF ONE-HALF TO JAMES A. BYRNE, OF LOS ANGELES, CALIFORNIA.

LIQUID-LEVEL GAUGE.

Application filed April 27, 1922. Serial No. 556,907.

*To all whom it may concern:*

Be it known that I, CHARLES J. MCCLURE, a citizen of the United States, residing at Eagle Rock, county of Los Angeles, State of California, have invented a new and useful Liquid-Level Gauge, of which the following is a specification.

It is the object of this invention to provide a gasoline gauge of the type employed upon automobiles, and in which a float mechanism is mounted in the fuel tank of the machine, and an indicator is mounted upon the instrument board of the automobile, with a flexible actuating connection between the float mechanism and the indicator.

It is the object of the invention to construct the float mechanism so that the flexible connection may extend directly therefrom toward the indicator, and without the possibility of binding said connection, or the necessity of forming relatively sharp lateral bends therein.

It is a still further object of the invention to provide a float mechanism adapted for convenient adjustment of the float level with relation to the operating means, in order that the device may be readily adapted to fuel tanks of different sizes.

With the foregoing and other objects in view, which will become apparent from the following description, the invention will be understood from the explanation of the accompanying drawings, in which:

Fig. 1 is a vertical section of the improved device.

Fig. 2 is a front elevation of the float mechanism.

Fig. 3 is a transverse section on the line 3—3 of Fig. 2.

Fig. 4 is a front elevation, partly broken away, of the indicator.

The indicator of the device is mounted upon the instrument board 1 of an automobile, and the float mechanism is received within the fuel tank 2.

The indicator is actuated in one direction by tensioning of a flexible connection leading to the float mechanism, and upon release of said tension, is moved in the opposite direction by spring means.

As an instance of this arrangement, casing 3 is received in an opening in the instrument board, and is provided with a front closure plate 4 having sight opening 5. A shaft 6 is journaled in a bracket 7 within the casing, and drums 8 and 9 are fixed upon said shaft. The drum 8 is in alinement with sight opening 5, and its periphery is graduated as shown at 10, to denote the amount of fuel in tank 2.

The drum 9 is grooved to receive a flexible connection shown as chain $10^a$, which is fixed to said drum, and extends through an aperture 11 at the rear of casing 3, and a spring 12 is arranged upon shaft 6 with one end connected to said shaft and its opposite end secured to bracket 7.

The parts are so arranged that tensioning of chain $10^a$ will rotate the drums and shaft against the action of spring 12, and so as to show decreasing graduations through sight openings 5, while release of said tension, will permit the spring to rotate the drums and shaft in the opposite direction, in order to display increasing graduations.

The float mechanism comprises a disc 15 mounted over an opening 16 in tank 2, with a gasket 17 between the disc and tank, and screws 18 for holding said disc in place. A tube 19 extends vertically below the disc so as to be received in tank 2, and the upper end of said tube is curved as shown at $19^a$, so as to extend through disc 15 and lie upon the upper surface thereof. The tube is thus supported by the disc, and the outer end of the tube extends radially of the disc and projects forwardly toward the indicator of the device.

The tube 19 extends through a supporting bracket 20 depending from disc 15, and the lower end of the tube is slotted at one side as shown at 21. A rack bar 22 is received in the tube with its teeth 23 projecting through slot 21. A frictional clamping sleeve 24 is adjustable along tube 19 and has a lateral bracket 25 projecting beyond slot 21. A segmental pinion 26 is journaled in bracket 25 and meshes with teeth 23. An arm 27 is fixed at one end to the segmental pinion, and extends laterally across tube 19 and beyond the same. A float 28 is pivoted upon the outer end of this arm, so as to remain flat upon the surface of the fuel in tank 2, as the arm 27 and the pinion swing up and down with the rise and fall of the fuel level.

A flexible connection is provided between rack bar 22 and chain $10^a$, and for this purpose a curved tube 30 extends beyond casing 3 at aperture 11, and a flexible tubing 32 connects said curved tube and the outer end of curved tube 19ª. A flexible connection shown as wire 31, extends through tubes 30, 32, 19ª, and 19, and is secured at its respective ends to chain 10ª and to bar 22.

By the construction as thus described, it will be seen that as the fuel level in tank 2 falls, the float mechanism will swing downwardly so as to lower rack bar 22, and as a consequence wire 31 and chain 10ª will be tensioned to actuate the indicator as previously described. As the fuel level rises, the float is elevated accordingly, so as to release the tension upon the flexible operating connection, and thereby permit the spring 12 to actuate the indicator in the opposite direction.

It will be noted that the improved construction, permits of adjustment of the float relative to rack 22, by sliding sleeve 24 along tube 19, so that the device may be adapted for tanks of different sizes.

It will also be observed that the arrangement of tube 19 in a vertical position, as is made possible by the operating connection with the float, and the curving of the end of said tube toward the front of the automobile where the indicator is mounted, permits of a direct tensioning of the flexible connection, without the necessity of lateral bend.

While I have illustrated and described but one practical embodiment of the invention, it will be apparent that various changes may be made in the construction, combination, and arrangement of parts, without departing from the spirit of the same.

I claim:

1. A liquid level gauge comprising indicating means, a guide tube having means for supporting the same in substantially vertical position in a tank, said tube being longitudinally slotted at one side, a rack longitudinally slidable in said tube with its teeth in alinement with said slot, an operating connection between said rack and said indicating means extending through said tube, a frictional clamping sleeve adjustable along said tube and longitudinally slotted in alinement with said tube slot, a bracket projecting laterally from said sleeve at one side of said slots, a pinion journaled on said bracket and meshing with said rack through said slots, an arm secured to and projecting radially from said pinion, and a float on said arm.

2. A liquid level gauge for a tank having an opening therein, comprising indicating means, a closure means for said opening, a fixed tube extending through said closure means with its end below said closure means depending substantially vertically into said tank and its end above said closure means extending radially of the longitudinal axis of the depending portion of the tube, a rack longitudinally slidable in the depending portion of the tube, a flexible member connected to said rack and extending through the radially disposed portion of the tube and operatively connected to said indicating means, a pinion supported by the depending portion of the tube and meshing with said rack, an arm secured to and projecting radially from said pinion, and a float on said arm.

3. A liquid level gauge for a tank having an opening therein, comprising indicating means, a closure means for said opening, a tube extending through said closure means with its end below said closure means depending substantially vertically into said tank and its end above said closure means extending radially of the longitudinal axis of said depending portion of the tube, said depending portion of the tube having a longitudinal slot at right angles to the radially disposed end of said tube, a rack longitudinally slidable in the depending portion of the tube and having its teeth in alinement with said slot, a flexible member connected to said rack and extending through the radially disposed portion of the tube and operatively connected to said indicating means, a frictional clamping sleeve longitudinally adjustable along the depending portion of said tube and having a longitudinal slot in alinement with the tube slot, a bracket projecting laterally from said sleeve at one side of said slots, a pinion journaled on said bracket and meshing with said rack through said slots, an arm secured to and projecting radially from said pinion whereby said pinion and arm swing in a plane transversely to the radially disposed end of said tube, and a float on said arm.

4. A liquid level gauge for a tank having an opening therein, comprising indicating means, a closure means for said opening, a tube extending through said closure means with its end below said closure means depending substantially vertically into said tank, a bracket at the underside of said closure means having clamping fingers engaging said tube for supporting the latter relative to said closure means, a rack longitudinally slidable in the depending portion of the tube, a flexible member connected to said rack and extending through the portion of said tube above said closure means and operatively connected to said indicating means, a pinion supported by the depending portion of the tube and meshing with said rack, an arm secured to and projecting radially from said pinion, and a float on said arm.

5. A liquid level gauge for a tank having an opening therein, said gauge comprising indicating means, a closure means for said opening, a fixed tube extending through said closure means with its end below said closure means depending substantially vertically into said tank and its end above said closure means extending radially of the longitudinal axis of the depending portion of the tube, the depending portion of said tube being longitudinally slotted, a rack longitudinally slidable in the depending portion of the tube with its teeth in alinement with said slot, a frictional clamping sleeve adjustable along the depending portion of said tube and longitudinally slotted in alinement with said tube slot, a bracket projecting laterally from said sleeve at one side of said slots, a pinion journaled on said bracket and meshing with said rack through said slots, an arm secured to and projecting radially from said pinion, a float on said arm, and a flexible member connected to said rack and extending through the radially disposed portion of the tube and operatively connected to said indicating means.

In testimony whereof I have signed my name to this specification.

CHARLES J. McCLURE.